(12) United States Patent
Olsen et al.

(10) Patent No.: US 10,191,793 B2
(45) Date of Patent: Jan. 29, 2019

(54) MICROPROCESSOR DEVICE WITH RESET TIMER

(71) Applicant: NORDIC SEMICONDUCTOR ASA, Trondheim (NO)

(72) Inventors: Lasse Olsen, Trondheim (NO); Joar Rusten, Trondheim (NO); Arne W. Venas, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 268 days.

(21) Appl. No.: 14/411,072

(22) PCT Filed: Jun. 14, 2013

(86) PCT No.: PCT/GB2013/051560
§ 371 (c)(1),
(2) Date: Dec. 23, 2014

(87) PCT Pub. No.: WO2014/001758
PCT Pub. Date: Jan. 3, 2014

(65) Prior Publication Data
US 2015/0339179 A1 Nov. 26, 2015

(30) Foreign Application Priority Data
Jun. 26, 2012 (GB) .................................. 1211343.7

(51) Int. Cl.
*G06F 11/07* (2006.01)
*G06F 11/14* (2006.01)

(52) U.S. Cl.
CPC ...... *G06F 11/0757* (2013.01); *G06F 11/1497* (2013.01)

(58) Field of Classification Search
CPC ......................... G06F 11/0757; G06F 11/1497
(Continued)

(56) References Cited

U.S. PATENT DOCUMENTS 4,796,211 A * 1/1989 Yokouchi ............ G06F 11/0757
714/55
5,594,865 A    1/1997 Saitoh
(Continued)

FOREIGN PATENT DOCUMENTS

GB    2185339 A    7/1987
JP    S60-039255    2/1985
(Continued)

OTHER PUBLICATIONS

Form PCT/ISA/220 notification of transmittal of the international search report and written opinion of the international searching authority dated Sep. 27, 2013, Form PCT/ISA/210 International Search Report, PCT/ISA/237 Written Opinion of the International Searching Authority for PCT/GB2013/051560.
(Continued)

*Primary Examiner* — Elmira Mehrmanesh

(57) ABSTRACT

A microprocessor comprises a timer capable of resetting the device and a plurality of hardware registers (4) arranged logically so that a collective predetermined state of the registers (4) prevents the device from resetting. The device further comprises software (2) with a plurality of functions arranged to place said registers (4) in said predetermined state if each of said functions has executed properly.

4 Claims, 2 Drawing Sheets

Figure 1:
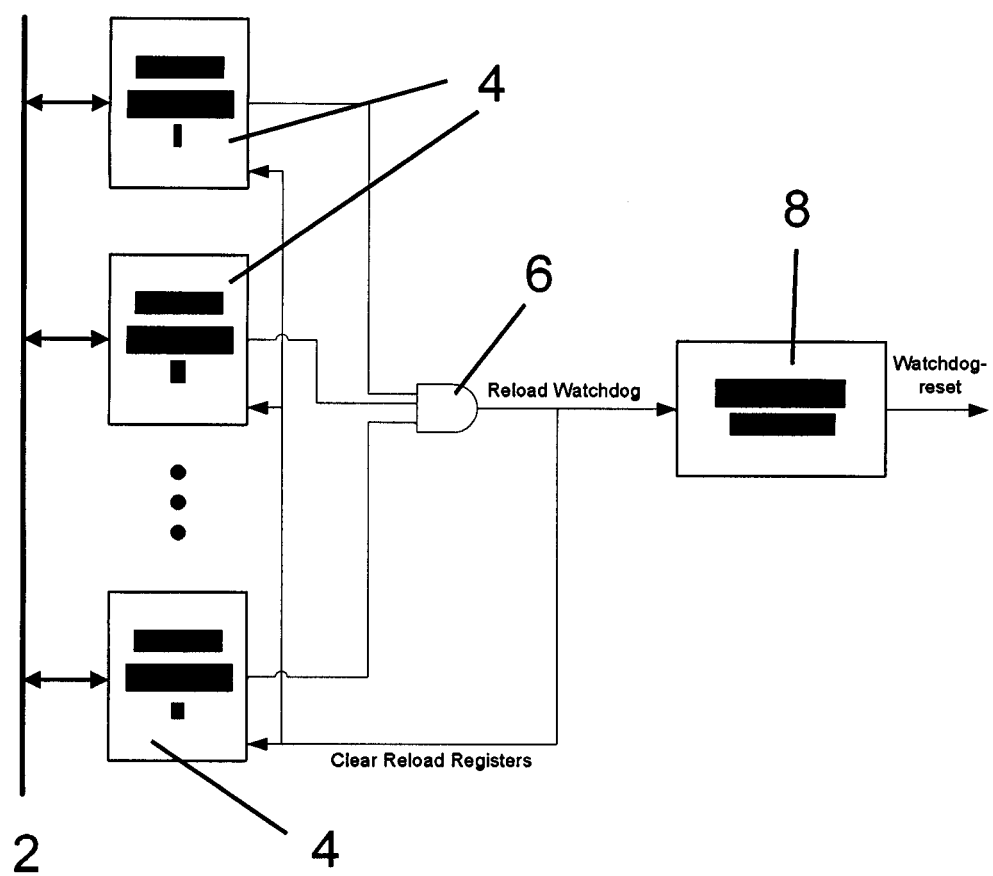
Figure 2:
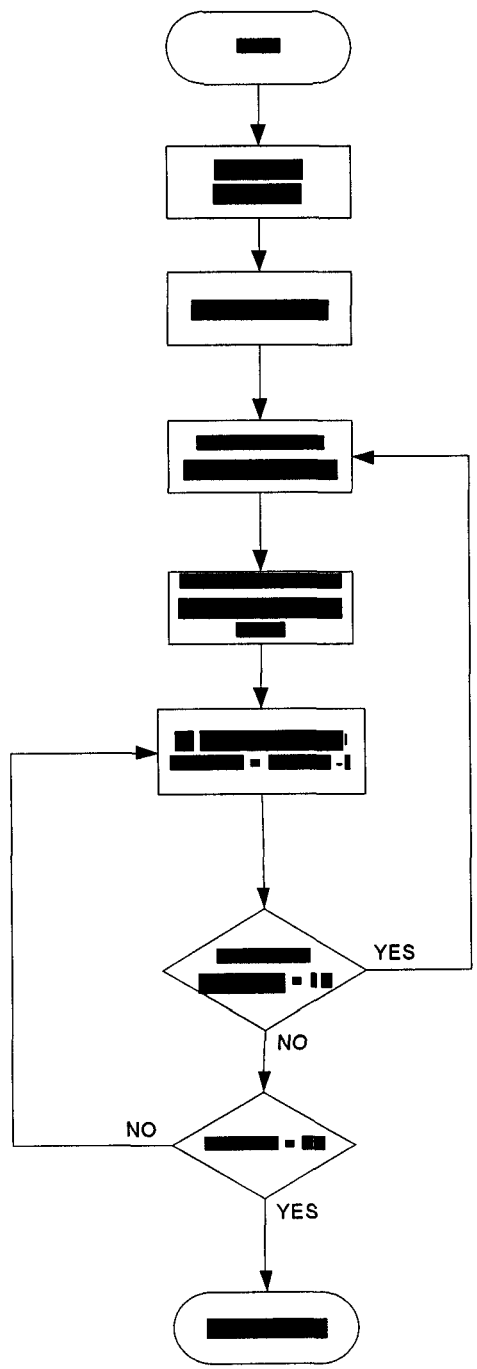

(58) Field of Classification Search
USPC .......................................................... 714/55
See application file for complete search history.

(56) References Cited

U.S. PATENT DOCUMENTS

| | | | | |
|---|---|---|---|---|
| 6,505,298 | B1* | 1/2003 | Cerbini | G06F 11/0757 709/220 |
| 6,806,786 | B1* | 10/2004 | Lam | H03L 7/10 327/147 |
| 7,516,311 | B2* | 4/2009 | Alsup | G06F 9/4818 712/228 |
| 7,689,875 | B2* | 3/2010 | Cahill | G06F 11/0757 714/23 |
| 7,721,083 | B2* | 5/2010 | Ikedo | G06F 9/4403 713/1 |
| 8,954,801 | B2* | 2/2015 | Tatsuno | G06F 11/0793 714/15 |
| 2011/0128765 | A1* | 6/2011 | MacWilliams | G06F 12/0646 365/52 |
| 2012/0041635 | A1* | 2/2012 | Johnson | G07C 5/008 701/31.4 |

FOREIGN PATENT DOCUMENTS

| | | |
|---|---|---|
| JP | 60039255 A | 3/1985 |
| JP | S60-124748 A | 3/1985 |
| JP | 60124748 A | 7/1985 |
| JP | S62-163152 | 6/1987 |
| JP | 63307547 A | 12/1988 |
| JP | H05-158746 | 12/1991 |
| JP | 04209038 A | 7/1992 |
| JP | 04238547 A | 8/1992 |
| JP | 08292901 A | 11/1996 |
| JP | 2000029747 A | 1/2000 |
| JP | 2005-92430 | 4/2005 |
| JP | H4-238547 A | 10/2006 |
| JP | 2011-022934 | 2/2011 |
| TW | 2008-17983 A | 4/2008 |
| TW | 2008-20626 A | 5/2008 |
| TW | 2010-09713 A | 3/2010 |

OTHER PUBLICATIONS

UK Search Report for GB1211343.7 dated Nov. 8, 2012.
International Preliminary Report on Patentability from corresponding Appl. No. PCT/GB2013/051560, dated Jan. 8, 2015.
Office Action for Taiwanese Application No. 10212914; Dated Feb. 3, 2017.
Japanese Office Action for Application No. 2015-519324, dated Apr. 5, 2017.
Japanese Office Action for Application No. 2015-519324, dated Jan. 25, 2018.

* cited by examiner

MICROPROCESSOR DEVICE WITH RESET TIMER

This invention relates to the control of microprocessor devices—e.g. those provided on semiconductor chips.

It is common on microprocessor devices to provide a watchdog function to ensure proper operation. Typically these are arranged so that the device is forced to reset if a countdown timer reaches zero but the timer is restarted (so deferring such a reset) when the device indicates that it has successfully performed an operation or function. This is intended to provide a fail-safe monitoring of the proper operation of the device; under normal operation the timer is never allowed to reach zero. In more complex devices it has been proposed to arrange for firmware running on the device to maintain a number of software flags which must each be written to in order for the watchdog timer to be reset. This allows a number of separate modules or sub-routines to be monitored, with incorrect operation of any of them causing a reset.

However the Applicant has recognised a weakness with this arrangement; namely that since it is in principle for any software to write to any memory location, it is possible with a suitable software malfunction to write directly to the register which resets the timer thereby bypassing the protection it provides against erroneous operation.

The present invention aims to address this problem and when viewed from a first aspect the invention provides a microprocessor comprising a timer capable of resetting the device and a plurality of hardware registers arranged logically so that a collective predetermined state of the registers prevents the device from resetting, the device further comprising software having a plurality of functions arranged to place said registers in said predetermined state if each of said functions has executed properly.

Thus it will be seen by those skilled in the art that in accordance with the invention rather than a watchdog function with multiple inputs being provided in software and therefore vulnerable to the problem set out above, a watchdog function is provided using multiple hardware registers. This effectively means that the watchdog timer cannot be inadvertently reset by writing to a single wrong memory location since the state of all the hardware registers must be correct before the main watchdog timer is reset and this relationship is hard-wired on the device.

Conveniently the hardware registers must all be in the same state—e.g. all high or all low—in order to reset the timer. In the former case a simple hardware AND gate can be used to reset the timer (so preventing reset of the device) if the registers have all been properly written to by the software. Thus in a set of embodiments the software functions are each arranged to write a predetermined bit to said registers in the event of successful operation and the timer is reset if the same bit has been recorded in each of said registers.

Conveniently the registers are reset (e.g. to the opposite to the predetermined bit necessary to reset the watchdog timer) automatically at the appropriate point in time. This could be at predetermined intervals but more conveniently is when the timer is reset, i.e. the watchdog is restarted, or when the watchdog times out causing a system reset. This ensures that continual periodic monitoring of the proper functioning of the device is maintained. This will be synchronised to, and typically carried out by the software but could equally be carried out at a hardware level.

It is possible in accordance with the invention for a plurality of software functions to write to a single hardware register. Although this reintroduces the risk of software fault bypassing some of the protection, it does not give rise to the single point of failure associated with prior art proposals.

A particular embodiment of the invention will now be described, by way of example only, with reference to the accompanying drawing which is a schematic logical diagram of part of a microprocessor in accordance with the invention.

With reference to FIG. 1 there may be seen a logical subsystem of a microprocessor implemented on a semiconductor chip which comprises a software interface 2 in data communication with a plurality of hardware reload registers 4. These are all connected to an AND gate 6, the output of which is connected to a watchdog countdown counter 8. The output of the watchdog counter is used to perform a system reset if it reaches a particular value (e.g. zero).

In operation the watchdog is first configured by loading certain values from configuration registers—e.g. the timeout value to be used. The reload registers 4 are then all set to zero and the watchdog is loaded with the timeout value specified in the relevant configuration register. The counter is then reduced by 1 and a check is made as to whether all the reload registers are equal to 1 (by reading the value of the AND gate 6) and if the counter has not yet reached 0 it is reduced by one again and the loop is repeated.

As the software runs, various functions in the software, such as main routine and one or more sub-routines, are arranged to write high bits to respective reload registers 4 upon successful completion. Once all of the reload registers 4 are high the output of the AND gate 6 goes high and this causes the watchdog counter 8 to reset—i.e. reloaded with the timeout value. This also resets the reload registers back to zero.

As long as the software functions operate as intended they write to the respective reload registers often enough that the watchdog counter 8 does not reach zero. However if one or more of the software functions does not operate correctly and so does not write to the corresponding reload register 4, the AND gate 6 will not go high and so will not reset the watchdog counter 8. This will allow it to reach zero which causes it to prompt a system reset which will hopefully clear the software problem.

It will be appreciated that software errors can at most cause one of the reload registers 4 to be written to erroneously; it is not possible for any part of the software directly to reset the watchdog counter 8.

The invention claimed is:

1. A microprocessor device comprising a timer capable of resetting the device and a plurality of hardware registers arranged so that a collective predetermined state of the registers fixed by a hard-wired logical relationship between the registers resets the timer, the device further comprising software having a plurality of functions arranged to place said registers in said predetermined state if each of said functions has executed properly.

2. A microprocessor device as claimed in claim 1 wherein the software functions are each arranged to write a predetermined bit said registers in the event of successful operation and the timer is reset if the same bit has been recorded in each of said registers.

3. A microprocessor device as claimed in claim 1 wherein said registers are reset automatically.

4. A microprocessor device as claimed in claim 3 wherein said registers are reset automatically when the timer is reset or when the device is reset.

* * * * *